United States Patent Office.

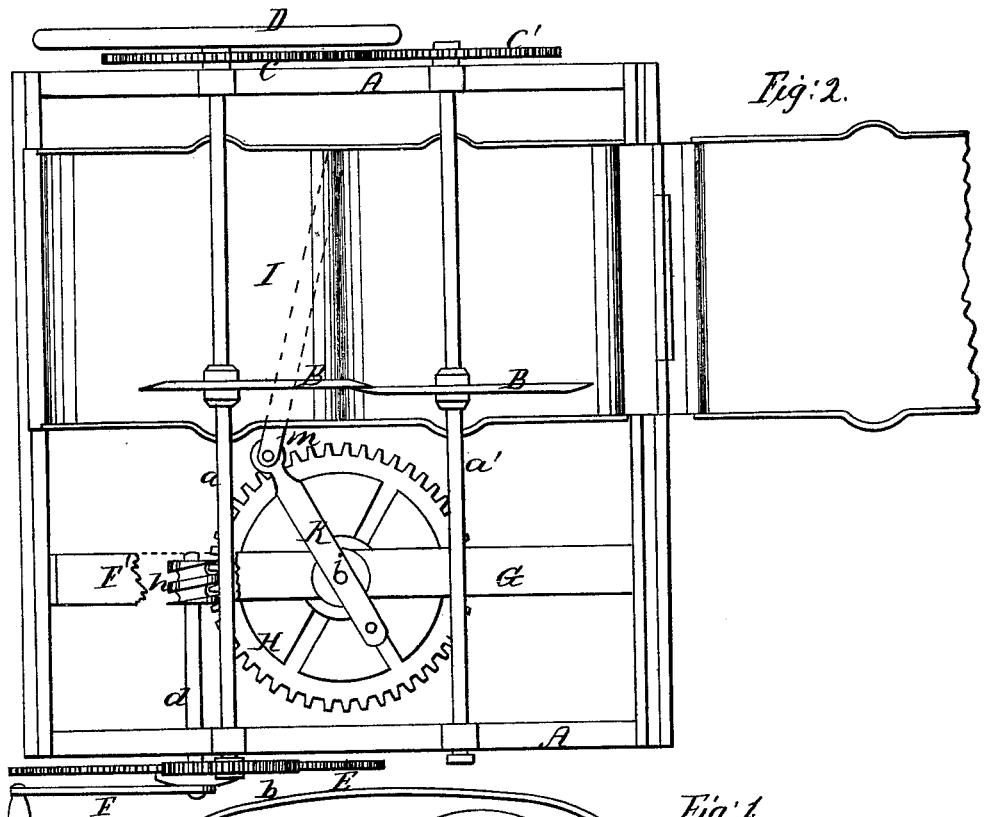
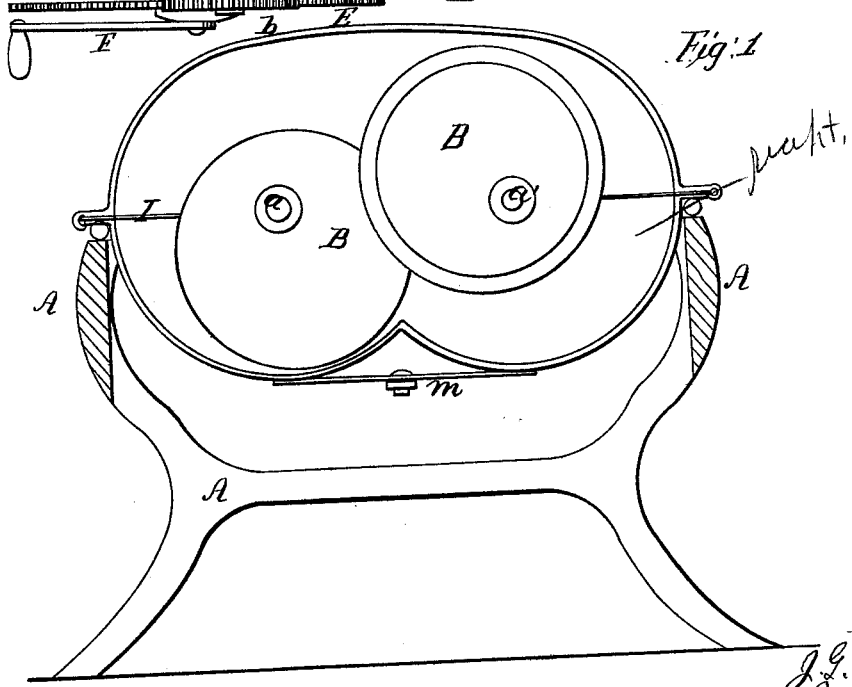

JAMES G. DIVOLL, OF SONORA, CALIFORNIA.

Letters Patent No. 91,526, dated June 22, 1869.

---

IMPROVED MEAT-CUTTING MACHINE.

---

The Schedule referred to in these Letters Patent and making part of the same.

---

*To all whom it may concern:*

Be it known that I, JAMES G. DIVOLL, of Sonora, county of Tuolumne, State of California, have invented a Meat-Cutting Machine; and I do hereby declare the following description and accompanying drawings are sufficient to enable any person skilled in the art or science to which it most nearly appertains, to make and use my said invention or improvements without further invention or experiment.

My invention relates to an improved apparatus for cutting or chopping meats, in order to cut them into pieces small enough to make sausage-meat. It can also be used for cutting any vegetable substance which it is desired to reduce in size; and It consists of two eccentric knives, operated by the proper mechanism, inside of a closed case or box, in in which the meats or vegetables to be cut are first placed.

The box is arranged to move back and forth, so that the knives will cut from side to side, thus bringing every portion of the substance to be cut under their action.

In order to more fully illustrate and explain my invention, reference is had to the accompanying drawings, forming a part of this specification, of which—

Figure 1 is a transverse vertical section.

Figure 2 is a plan with the cover removed.

Similar letters of reference in each of the figures indicate like parts.

A is a frame, of any suitable and convenient construction, and having the two parallel shafts, $a\ a'$, passing across its top, and bearing in boxes at each end.

These shafts have the two eccentric knives, B B, secured to them at their centre, in such a manner that while one is cutting, the other stands in the opposite direction.

The shaft $a$ has at one end the pinion $b$, and at the opposite end, the toothed wheel C and balance-wheel D.

The shaft $a'$ is also provided with a toothed wheel, $C'$, which gears into the wheel C, and receives its motion from it.

The driving-wheel E is toothed, and engages with the pinion $b$, and power is applied to it by means of a crank, F, thus communicating motion to the eccentric knives.

The shaft $d$, to which the driving-wheel E is attached, bears in the side of the frame, the opposite end bearing in a standard, which joins the plate F' to the plate G at one end, and is provided with an endless screw, $h$, which engages with the teeth on the wheel H, and causes it to revolve slowly.

The wheel H revolves on an upright shaft, $i$, bearing in the lower plate F, and passing through the upper plate G.

An arm, $k$, is secured to the upper end of this shaft, to the end of which is attached a connecting-rod, $m$, the opposite end being pivoted to the bottom of the case or box L.

The case L is made in two sections, the lower section being placed on ways on the sides of the frame, and the upper section being hinged to the lower at one end, so that it may be opened and closed for placing the meats to be cut inside the case.

The bottom of the case is made in two curves, a ridge being formed between the two knives, so that each knife will operate on each side of the ridge.

The same power which causes the knives to operate, causes the case to be moved from end to end of the frame, the knives operating inside, and cutting back and forth as the case moves.

The peculiar arrangement of the arm K and connecting-rod $m$ is such, that the box moves back and forth across the frame without changing the direction of the driving wheel, the arm K passing around, and each half of its revolution carrying the case in the opposite direction from the one in which it has just been moving.

The knives B B operate, one in each half of the box or case, and in opposite directions, their manner of adjustment giving to them a drawing and cutting-motion as they revolve, operating in a similar manner to the two blades of a pair of shears.

The box moving from side to side, causes them to cut through the substance to be chopped, similar to the movement of a screw, thus cutting the substance equally throughout.

During the operation, the meat or other substance should be occasionally stirred, so as to more thoroughly subject it to the cutting of the knives, the upper portion of the case being closed to prevent the knives from throwing any particles out of the case.

Having thus described my invention,

What I claim, and desire to secure by Letters Patent, is—

1. The eccentric chopping-knives B B, revolving in opposite directions upon the parallel shafts $a\ a'$, and operated by gearing connected with the driving-wheel E, substantially as and for the purpose described.

2. The chopping-case L, moving from end to end of the frame, and having the eccentric chopping-knives B B revolving and cutting from side to side, substantially as and for the purpose herein described.

3. The combination of the endless screw $h$, toothed wheels H and K, and connecting-rod $m$, or an equivalent device, receiving their motion from the driving-wheel E, substantially as and for the purpose above described.

In witness whereof, I have hereunto set my hand and seal.

JAS. G. DIVOLL. [L. S.]

Witnesses:
WILLIAM STANIFORTH,
JOHN L. BOONE.